United States Patent Office 2,770,396
Patented Nov. 13, 1956

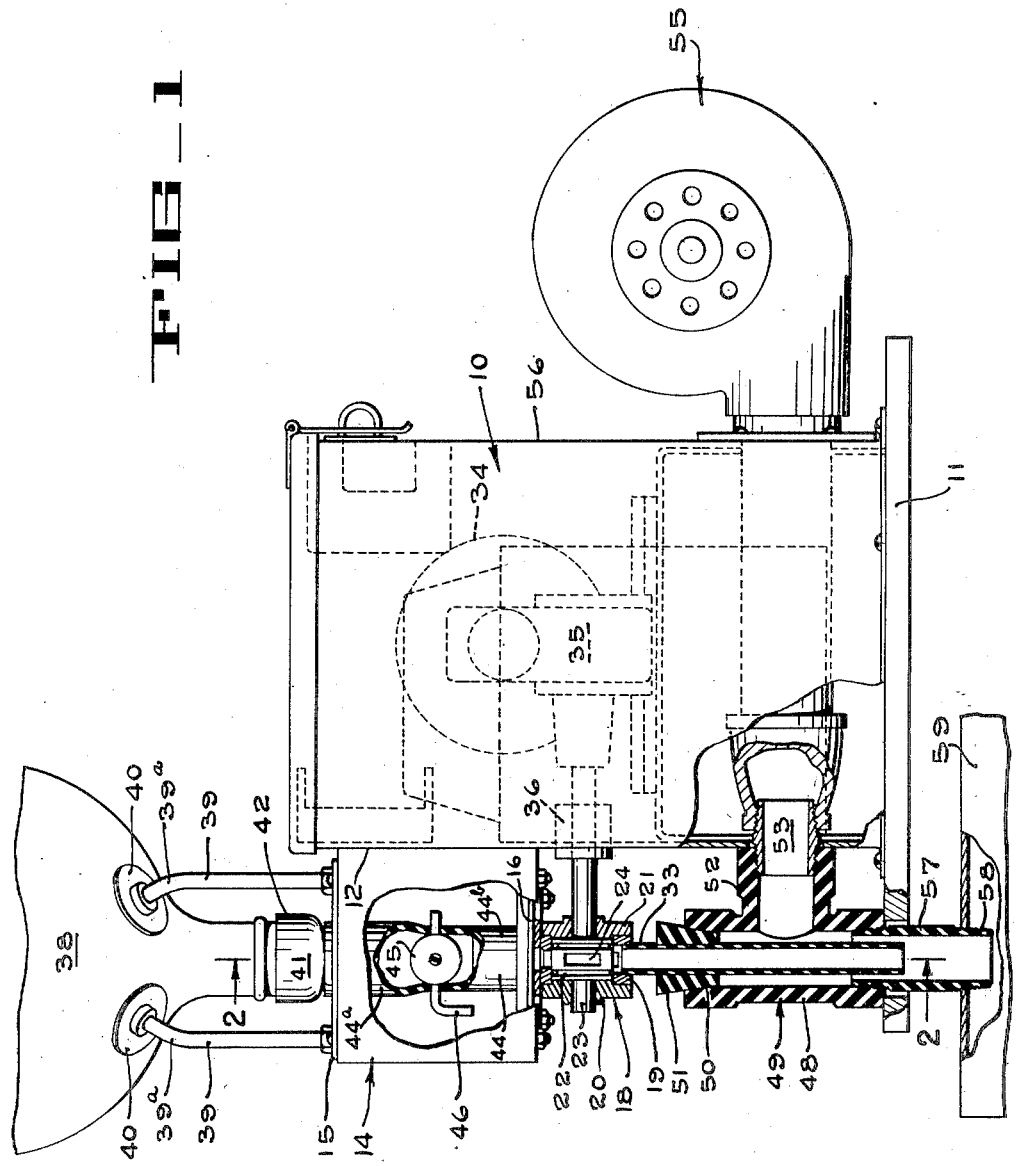

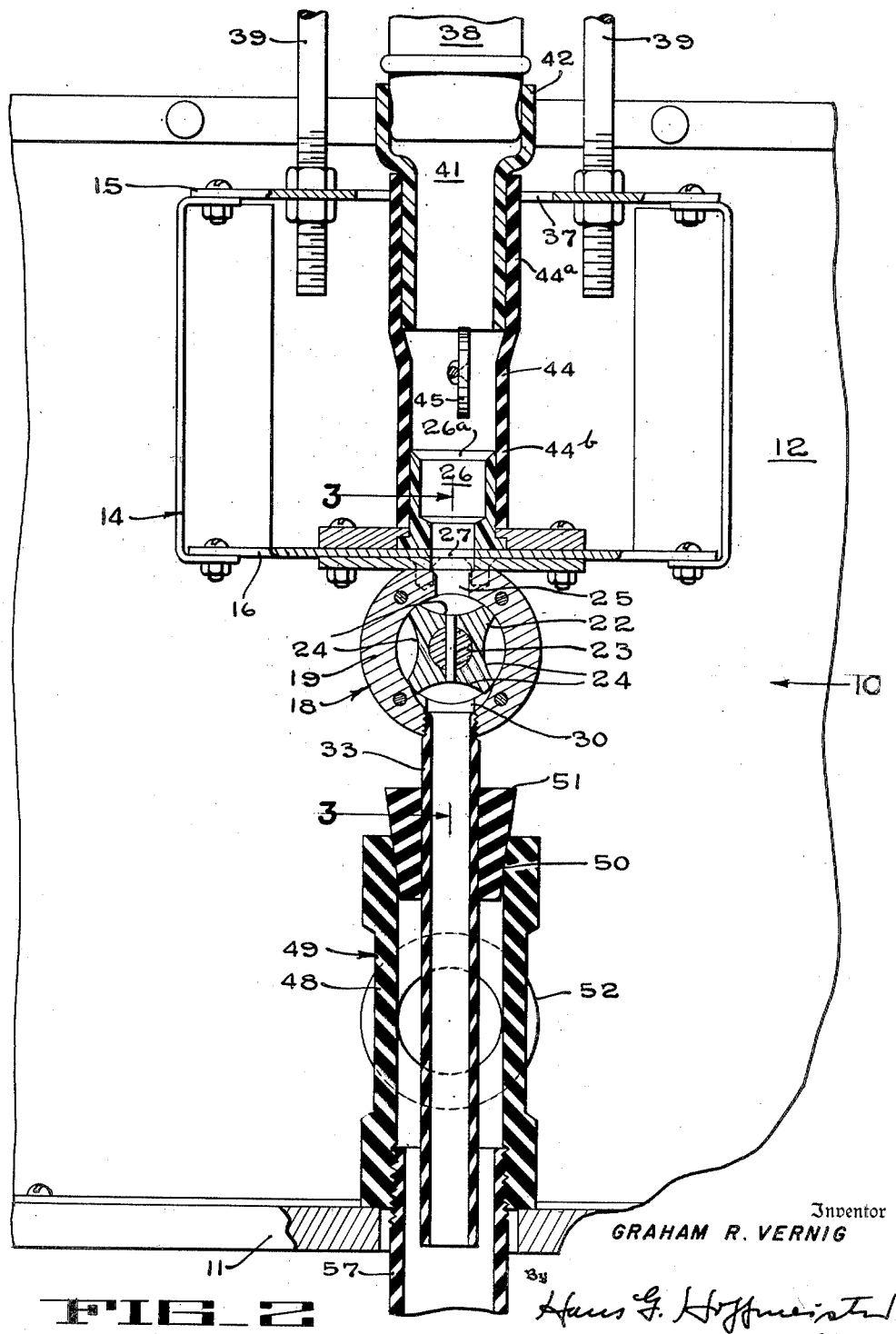

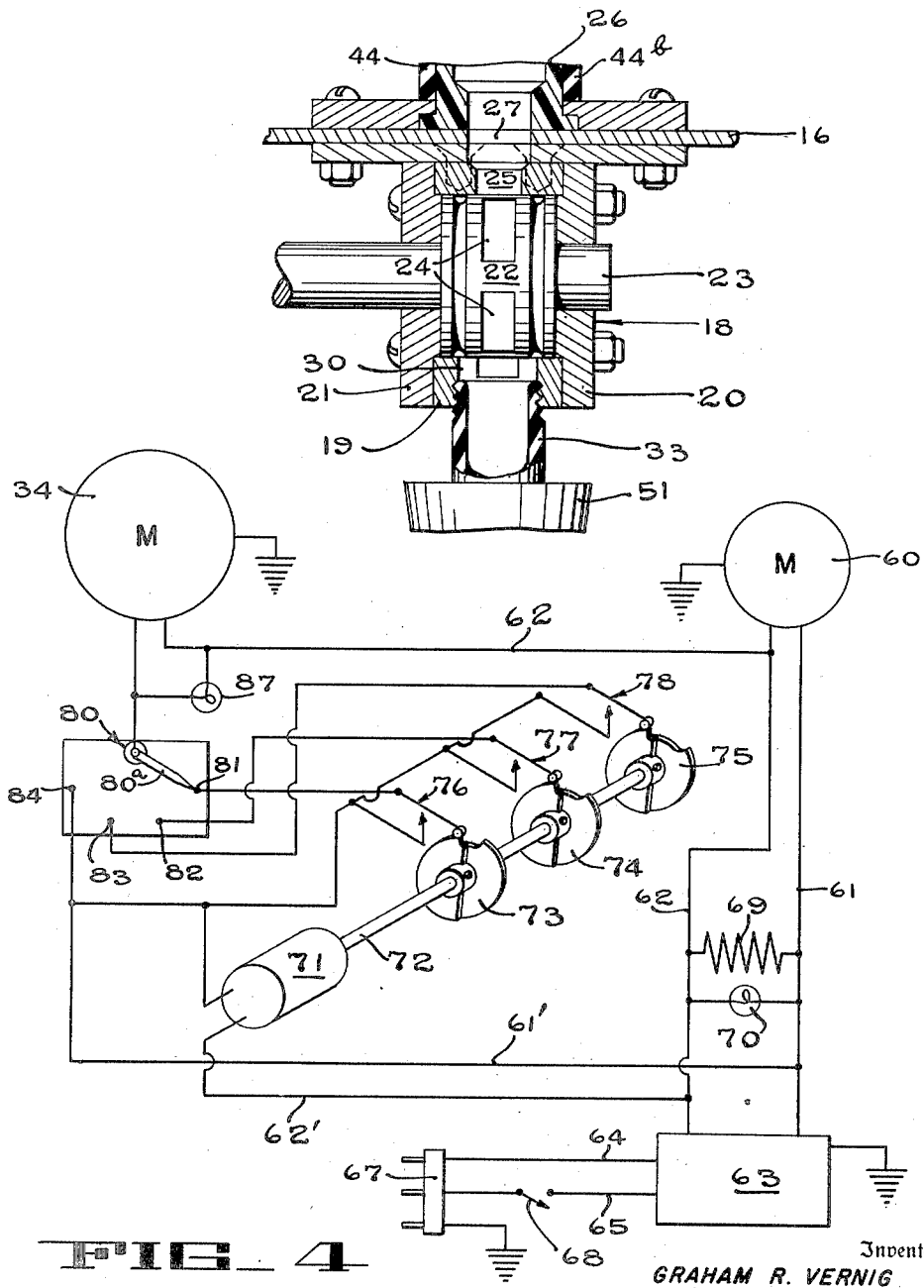

2,770,396

DISPENSING APPARATUS FOR POWDERED MATERIALS

Graham R. Vernig, San Jose, Calif., assignor to Food Machinery and Chemical Corporation, San Jose, Calif., a corporation of Delaware Application September 21, 1950, Serial No. 185,944

6 Claims. (Cl. 222—70)

This invention relates to apparatus for dispensing powdered material from containers.

To protect foodstuffs such as fruit or vegetables from the ravages of mold and decay during protracted storage and shipping periods, it is of advantage to treat them with solutions prepared from powdered germicidal substances, such as calcium hypochloride dissolved in suitable solvents such as water. In practice this is accomplished by conveying the produce through a shower of the germicidal solution emitted from a flooding device and for reasons of economy the surplus liquid draining from the produce is gathered and returned to the flooding device for renewed use. In treating fruit and vegetables in this manner it is of greatest importance that the germicidal solution be at all times maintained at its proper strength because if the solution should become too weak the treatment would remain ineffective. Hence, to maintain the solution at its proper strength during repeated use it is necessary to add periodically new supplies of the germicidal powder to the solution according to the rate at which the germicidal substance is consumed which depends on the nature of the produce, the speed and continuity with which the produce is contacted with the germicidal solution, and the extent to which the produce is contaminated by dirt, scale, soot, and other foreign matter. It has therefore been customary to ascertain empirically just what additions of the germicidal substance are necessary to maintain the solution at the required strength and to add the proper amounts of the germicidal substance periodically to the solution. For this purpose measuring valves have been employed that were controlled by electrical timing devices to deliver predetermined quantities of the germicidal powder from suitable containers at the proper time into a tank or conduit that formed part of the circulating system for the germicidal solution. However, powdered germicidal substances are frequently of a hygroscopic nature. Thus, when dispensing arrangements of the type referred to were set up, the powdered germicide in the supply valve, and even within the container itself, absorbed moisture rising from the liquid in the tank or conduit and formed lumps or pastes which interfered with the operation of the measuring valve and/or clogged the supply passages resulting in pitting of the valve, variations in the amount of germicide delivered into the tank per time unit and eventually in complete breakdown of the dispensing mechanism.

It is an object of the present invention to provide a simple and efficient apparatus for dispensing powdered material in predetermined quantities.

Another object is to provide an apparatus adapted to dispense measured quantities of powdered material of a hygroscopic nature into a body of liquid without danger of misoperation due to clogging.

An additional object is to provide means effective to prevent pitting and consequent misoperation of the measuring valves employed in dispensing apparatus of the type referred to.

Still another object is to provide a dispensing apparatus, of the type referred to, wherein the powdered material is completely protected from any moisture that may rise from the body of liquid into which the device is arranged to discharge.

These and other objects of my invention will be apparent from the following description of the accompanying drawings which illustrate a preferred embodiment thereof and wherein:

Fig. 1 is a side elevation of a dispensing apparatus embodying the invention, with part of its outer structure broken away to expose components underneath;

Fig. 2 is a fragmentary view of a vertical section through the apparatus shown in Fig. 1 taken along line 2—2 thereof and viewed in the direction of the arrows associated with said line;

Fig. 3 is a sectional detail view taken along lines 3—3 of Fig. 2 illustrating the measuring valve comprised in the apparatus of the invention; and Fig. 4 is a circuit diagram illustrating the manner in which the electrically driven components of the apparatus shown in Figs. 1 and 2 may be powered from a common source of power.

Referring to both Figures 1 and 2 the component mechanisms of the apparatus are partly supported from, and partly contained within, a housing 10 that rests upon a base plate 11. Suitably secured to the front wall 12 of the housing 10 near the upper end thereof is a bracket structure 14 that carries upper and lower horizontally positioned supporting plates 15 and 16, respectively. Depending from the underside of the lower supporting plate 16 is a measuring valve 18 that comprises an outer shell or housing 19 in the form of a hollow cylinder with its center axis extending horizontally and lengthwise of the housing 10. The opposite ends of said cylindrical shell are closed by circular cover plates 20 and 21, respectively. Disposed co-axially within said shell is a rotor 22 mounted upon a shaft 23 that is suitably journaled in said cover plates 20 and 21. The rotor 22 is of such diameter as to fit slidably within the shell 19 and formed within the outer surface of said rotor in equispaced relation circumferentially thereof are several identical transfer pockets 24 which may have the shape of concave recesses as best shown in Fig. 2. Provided in the upper sector of the shell 19 at the highest point thereof is an inlet opening 25 through which powdered material may flow into the interior of the measuring valve from a funnel or feed cup 26 that has an outwardly beveled upper edge 26a. Said cup is mounted upon the lower supporting plate 16 of the bracket structure 14 in vertical axial alignment with the inlet opening 25 and communicates with said inlet opening through a suitable aperture 27 in the plate 16. An outlet opening 30 is provided in the lower segment of the shell 19 at the lowest point thereof and threaded within said outlet opening is the upper end of a discharge tube 33.

In practical operation the powdered material is delivered into the cup 26 and whenever the rotor 22 turns about its axis, its pockets 24 carry equal amounts of the powdered material from the bottom of the cup to the outlet opening 30 of the shell 19 from where the powder discharges through the tube 33. Hence, the amount of powdered material dispensed by the valve 18 per time unit may readily be predetermined by adjusting the speed of the rotor 22. To operate the rotor 22 a motor 34 is arranged within the housing 10 and is operatively connected through a suitable transmission 35 and a coupling 36 to the rotor shaft 23, as shown in Fig. 1.

In order to supply the powdered material from a bottle or like container into the cup 26, an opening 37 is provided in the upper supporting plate 15 of the bracket structure 14 in vertical co-axial alignment with the cup 26, and to support an inverted bottle 38 in properly aligned position with its neck centered above said opening 37, four vertical stems 39 rise from said upper supporting plate 15 at points spaced equal angular distances apart along the periphery of said opening 37. The upper ends of said stems are bent inwardly as shown at 39a and carry rubber suction cups 40 that are adapted to engage and support the shoulder portion of an inverted bottle in appropriately centered position.

To guide the powder from the bottle into the inlet cup 26 a plastic cap 41 having a tubular extension 42 may be engaged over the end of the bottle neck as shown in Figs. 1 and 2. Said extension is of sufficient length to protrude through the opening 37 in the upper supporting plate 15 of the bracket structure 14 and is in turn engaged within the radially expanded upper end 44a of a connector tube 44 of rubber or the like. Said connector tube 44 has a radially contracted lower portion 44b which is arranged to fit removably over, and form a tight seal with, the upper edge 26a of the cup 26. In order that the bottle may be placed in inverted position upon the suction cups 40 without any danger of spilling its contents, a butterfly valve 45 having an operating handle 46 is provided within the connector tube 44 intermediately the ends thereof.

To prevent moisture rising from the tank or conduit, into which the powder is to be discharged, from entering the tube 33 and reaching the measuring valve with the harmful consequences mentioned hereinbefore, the tube 33 is arranged to extend, and discharge, into a stream of dry hot air that is constrained to flow in the same direction as the supply of powder passing through and discharging from said tube. For this purpose the run or cross leg 48 of a T-shaped fitting 49 is arranged to surround the tube 33 concentrically. The upper end of said cross leg 48 has a conical inner surface 50 and an annular stopper 51 of rubber, cork or the like is tightly wedged between said conical surface and the outer surface of the tube 33 so as to form an airtight seal. The stem 52 of the T-shaped fitting 49 is suitably connected to a conduit 53 that passes through the housing 10 near and parallel to its base plate 11 (Figure 1). Said conduit is in turn connected to the discharge nozzle of a blower 55 which is attached to the rear wall 56 of the housing 10. Threadably secured to the lower end of the cross leg 48 is a nipple 57 that extends downwardly through the base plate 11. The open bottom end of the discharge tube 33 is arranged to protrude a limited distance into the interior of said nipple as shown. The lower end of the nipple 57 may be threaded as shown at 58 so that it may readily be connected to the tank or conduit 59 that carries the liquid which is to be supplied with powder from the bottle 38.

In practical performance the blower 55 is continually operated to direct a stream of dry hot air into the cross leg 48 of the T-shaped fitting 49. Said air flows around the discharge tube 33 and finds no other outlet but downwardly through the nipple 57. Thus, both the powder and the hot air supplied by the blower 55 pass through the nipple 57 countercurrently to any moisture that may rise from a body of liquid below. As a result thereof any such moisture is effectively prevented from entering the discharge tube 33, and cannot reach the valve 18 or penetrate to the intake cup 26 or the supply bottle above said valve. Thus, neither the discharge tube, nor the measuring valve or its intake cup will be clogged or damaged by moist powder and continuous accurate operation of the dispensing apparatus is insured.

While the blower 55 is kept in operation as long as the apparatus is in use, as has been pointed out hereinbefore, the measuring valve 18 will be operated at intervals and for periods of time which are determined by the amount of powdered material that must be added to a particular germicidal solution to maintain its effectiveness and which may be ascertained by tests under practical operating conditions. Once this has been done, the apparatus of the invention may readily be controlled by automatic means requiring no other attention than occasional refilling of the supply bottle.

An exemplary system for controlling the operation of the apparatus of the invention is diagrammatically represented in Fig. 4. In said figure the motor 60 of the blower 55 is connected directly across the output leads 61 and 62 of a transformer 63. Said transformer has input leads 64 and 65 which may be connected to a suitable source of A. C. voltage by means of a plug 67. A power control switch 68 may be provided on one of said input leads to control operation of the system without need to withdraw the plug 67 from its contact. A heater 69 for heating the stream of air supplied by the blower 55 and a pilot light 70 may likewise be connected across the leads 61 and 62. Thus, whenever the plug 67 is plugged into an appropriate source of A. C. voltage and the main control switch 68 is closed, the blower 55 will operate to deliver hot air into the cross leg 48 of the T-shaped fitting 49 and the pilot light 70 will be illuminated indicating to attending personnel that the blower is in operation.

Connected across branches 61' and 62' of the leads 61 and 62, respectively, is a program motor 71 that may be mounted within the housing 10 and which, like blower 55, operates continuously as long as the power switch 68 remains closed. A shaft 72 driven from said program motor 71 carries three rotary cams 73, 74, and 75, respectively, and is arranged to turn at a very slow rate, say, one third of a revolution per minute. Each of said cams is adapted to effect temporary closure of an associated power control switch 76, 77 and 78, respectively, that may be adapted to connect the valve operating motor 34 temporarily across the leads 61' and 62 depending upon the setting of the arm 80a of a selector switch 80 which may likewise be mounted within the housing 10. As shown in Figure 4, said selector switch has four contacts 81, 82, 83, and 84, one for each of the three cam controlled switches 76, 77, and 78, and a fourth contact that connects the valve-operating motor 34 permanently across the leads 61' and 62, whenever the selector arm 80a is moved into contact therewith.

The control cams 73, 74, and 75 have switch actuating depressions and are preferably of the adjustable type with said depressions adjusted to different angular widths, such that each is adapted to effect closure of its associated switch under the force of spring means (not shown) for a different period of time. For instance, the depression in cam 73 may be of an angular width of 6° while the depressions in cams 74 and 75 may be of angular widths of 12° and 18°, respectively. Thus, assuming the speed of the cam shaft 72 to be ⅓ of a revolution per minute, as mentioned hereinbefore, an attendant may adjust the apparatus of the invention to dispense powder for 3 seconds at intervals of 177 seconds, or for 6 and 12 seconds at intervals of 174 and 168 seconds, respectively, depending on whether he sets the arm of the selector switch to the contacts 81, 82, or 83; or he may adjust the apparatus to dispense the powdered germicide continuously by setting the arm of the selector switch to the contact 84. To visibly indicate whether or not the measuring valve is in operation another pilot light 87 may be connected across the leads 61' and 62 at a point intermediately of the selector switch 80 and valve motor 34.

While I have described my invention with the aid of a particular embodiment thereof, I do not wish to be limited to the specific constructional details shown and described which may be departed from without departing from the spirit and scope of the invention. Thus, while I have described the apparatus of my invention as employed to dispense a germicidal powder, it will be understood that the utility of the apparatus is not limited to powders of this nature. It may advantageously be employed to dispense any type of powdered material wherever vapor or gases may endeavor to enter dispensers at the discharge ends thereof and threaten to interfere with the proper operation of the dispensing and measuring mechanisms.

I claim:

1. Apparatus for dispensing metered quantities of comminuted hygroscopic material and protecting the same from contact with the atmosphere, said apparatus comprising in combination a container in which said material is stored and which is provided at the lower end thereof with a material discharge opening, a metering valve having an inlet opening in its upper side and an outlet opening in its lower side, means interconnecting the material discharge opening of said container and the inlet opening of said metering valve in sealed relation, means operably connected to said metering valve in a manner to selectively effect intermittent or continuous actuation of the same to thus regulate passage of said material therethough, a material discharge tube connected to and depending from the outlet opening of said metering valve, a tubular enclosure mounted to concentrically surround the major portion of said discharge tube and to have the lower portion thereof extend downwardly beyond the lower end of said discharge tube a substantial distance, continuously operating means connected with said tubular enclosure to direct a continuous stream of a dry gaseous fluid into the annular space formed by the coextensive portions of said discharge tube and said tubular enclosure, and means to constrain the escape of said stream of dry gaseous fluid with the material discharging from said discharge tube through the lower end of said tubular disclosure.

2. Apparatus for dispensing metered quantities of a powdered material from a bottle into a body of liquid, including a metering valve having an inlet opening in its upper segment and an outlet opening in its lower segment, means for supporting a bottle in inverted position above said inlet opening with its neck in coaxial alignment therewith, a discharge tube connected with and depending from the outlet opening of said valve, a T-fitting mounted to have the run thereof concentrically surround the major portion of said discharge tube, a blower having a nozzle connected to the lateral of said T-fitting to direct a continuous stream of a dry gaseous fluid into the annular space formed by the coextensive portions of said discharge tube and the run of said T-fitting, a stopper member blocking the annular space between said discharge tube and the run of said T-fitting at the upper end of the latter, and a discharge nipple connected to the lower end of the run of said T-fitting in a manner to extend downwardly therefrom in axial prolongation thereto and to have the lower end portion of said discharge tube protrude co-axially within the upper portion of said discharge nipple.

3. Apparatus for supplying powdered material from a container into a body of liquid comprising a conduit descending from the container and terminating with its lower end above the level of the body of liquid, a second conduit in the form of a tubular enclosure mounted to surround in spaced relation the major portion of said first conduit and to have the lower portion thereof extend downwardly beyond the lower end of said first conduit a substantial distance, means connected with said tubular enclosure to direct a continuous stream of a dry gaseous fluid into the space formed by the co-extensive portions of said first and second conduits, and means constraining said stream of dry gaseous fluid to escape through an opening at the lower end of said tubular enclosure.

4. Apparatus for supplying measured quantities of a powdered material into a body of liquid comprising a container for said powdered material disposed above the body of liquid, a first conduit descending from said container, a metering device interposed in said conduit, a second conduit mounted to concentrically surround said first conduit below said metering device and to have the lower portion thereof extend downwardly beyond the lower end of said first conduit a substantial distance, means connected with said second conduit to direct a continuous stream of dry hot air into the annular space formed by the co-extensive portions of said first and second conduits, and means constraining said stream of dry hot air to escape with the powder discharging from said first conduit through the lower end of said second conduit.

5. Apparatus for supplying powdered material from a container into a moist atmosphere comprising a first conduit communicating with the container and extending outward therefrom, said first conduit having its outer end open, a second conduit mounted to surround the outer end portion of said first conduit in spaced relation thereto and to have its outer end portion extend beyond the outer end portion of said first conduit a substantial distance, and means connected with the second conduit to direct a continuous stream of dry gas outwardly through the second conduit to entrain said powdered material and to escape through the outer end of said second conduit.

6. Apparatus for dispensing metered quantities of a powdered material from a bottle into a body of liquid, including a rotary metering valve comprising a horizontally positioned cylindrical housing having an inlet opening in its upper segment and an outlet opening in its lower segment, a rotor arranged coaxially within said housing and having a plurality of pockets arranged within its outer surface circumferentially thereof, a motor operably connected to said rotor, a funnel associated with the inlet opening of said housing, means for supporting a bottle in inverted position above said funnel with its neck in coaxial alignment therewith, tubular guide means arranged to detachably engage said inlet funnel and the neck of a bottle on said supporting means for guiding powdered material dropping from said bottle into said funnel, a butterfly valve provided within said tubular guide means, a discharge tube connected with and depending from the outlet opening of said valve housing, a tubular enclosure mounted to concentrically surround the major portion of said discharge tube and to have the lower portion thereof extend downwardly beyond the lower end of said discharge tube a substantial distance, and a blower connected with said tubular enclosure to direct a continuous stream of a dry gaseous fluid into the annular space formed by the coextensive portions of said discharge tube and said tubular enclosure for discharge of the same through an opening at the lower end of said tubular enclosure.

References Cited in the file of this patent

UNITED STATES PATENTS

| | | |
|---|---|---|
| 1,728,526 | Brunhoff | Sept. 17, 1929 |
| 1,963,532 | Sheldon | June 19, 1934 |
| 2,120,003 | Schanz | June 7, 1938 |
| 2,326,276 | Avedikian | Aug. 10, 1943 |
| 2,453,465 | Sloan | Nov. 9, 1948 |
| 2,673,006 | Emmons et al. | Mar. 23, 1954 |